US009557043B2

(12) United States Patent
Smith et al.

(10) Patent No.: US 9,557,043 B2
(45) Date of Patent: Jan. 31, 2017

(54) EASY-INSTALL HOME AUTOMATION LIGHT SWITCH

(71) Applicant: EchoStar Technologies L.L.C., Englewood, CO (US)

(72) Inventors: George Horkan Smith, Atlanta, GA (US); Bernard Anthony McCarthy, III, Atlanta, GA (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 142 days.

(21) Appl. No.: 14/028,426

(22) Filed: Sep. 16, 2013

(65) Prior Publication Data

US 2015/0077021 A1 Mar. 19, 2015

(51) Int. Cl.
| | |
|---|---|
| H05B 37/02 | (2006.01) |
| H05B 39/06 | (2006.01) |
| H05B 41/04 | (2006.01) |
| H05B 41/18 | (2006.01) |
| F21V 23/04 | (2006.01) |
| H01H 9/02 | (2006.01) |

(52) U.S. Cl.
CPC ........ *F21V 23/0435* (2013.01); *H01H 9/0271* (2013.01); *H05B 37/0209* (2013.01); *H05B 37/0272* (2013.01); *Y02B 20/48* (2013.01)

(58) Field of Classification Search
USPC ............................ 315/291–311, 362, 149–169
See application file for complete search history.

(56) References Cited

U.S. PATENT DOCUMENTS

| | | | | |
|---|---|---|---|---|
| 5,458,311 | A * | 10/1995 | Holbrook | H05B 39/088 248/205.1 |
| 5,738,496 | A | 4/1998 | Mehta | |
| 8,274,226 | B1 * | 9/2012 | Sikora et al. | 315/77 |
| 8,797,723 | B2 * | 8/2014 | Hilton et al. | 361/679.01 |
| 2009/0206769 | A1 | 8/2009 | Biery et al. | |
| 2009/0251352 | A1 * | 10/2009 | Altonen | H01H 9/025 341/176 |
| 2010/0141153 | A1 * | 6/2010 | Recker | H05B 33/0803 315/149 |
| 2010/0327766 | A1 * | 12/2010 | Recker | H02J 9/02 315/291 |
| 2011/0133655 | A1 * | 6/2011 | Recker et al. | 315/159 |
| 2012/0067610 | A1 * | 3/2012 | Stonebraker | H02G 3/081 174/50 |
| 2014/0291132 | A1 * | 10/2014 | Todd | H01H 9/02 200/333 |

FOREIGN PATENT DOCUMENTS

| | | | |
|---|---|---|---|
| EP | 1 524 750 | A2 | 4/2005 |
| EP | 1 843 642 | A2 | 10/2007 |

OTHER PUBLICATIONS

International Search Report and Written Opinion, mailed Nov. 27, 2014, for International Application No. PCT/US2014/054549, 14 pages.

* cited by examiner

*Primary Examiner* — Brandon S Cole
(74) *Attorney, Agent, or Firm* — Seed IP Law Group LLP

(57) ABSTRACT

A light switch plate includes a wireless transmitter for transmitting control signals to a smart light assembly. The light switch plate is placed over a conventional light switch and prevents a user from further manipulating the conventional light switch. The light switch plate includes a further switch which a user can manipulate to cause the transmitter to transmit control signals to turn on or turn off a light of the smart light assembly.

9 Claims, 6 Drawing Sheets

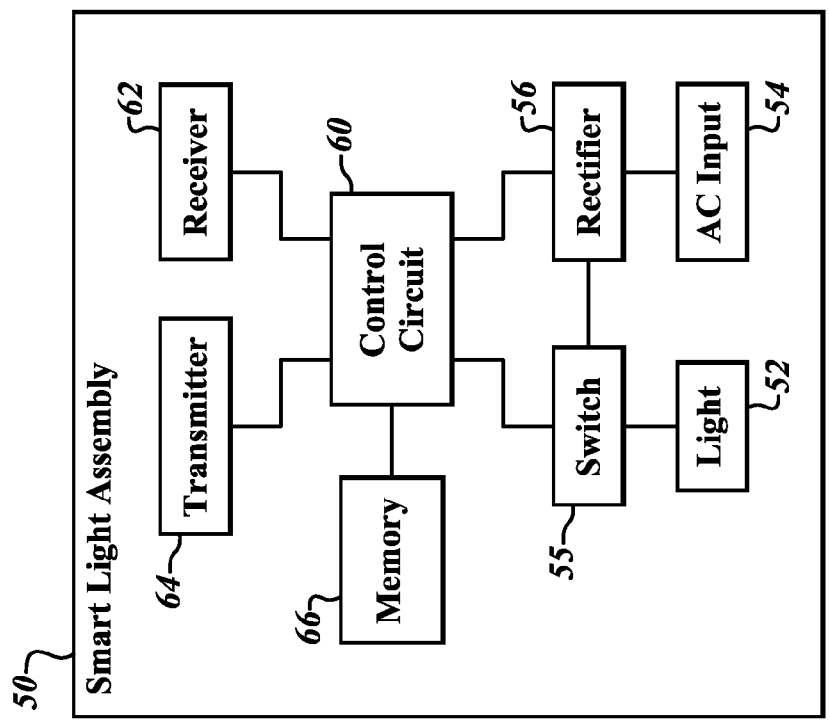
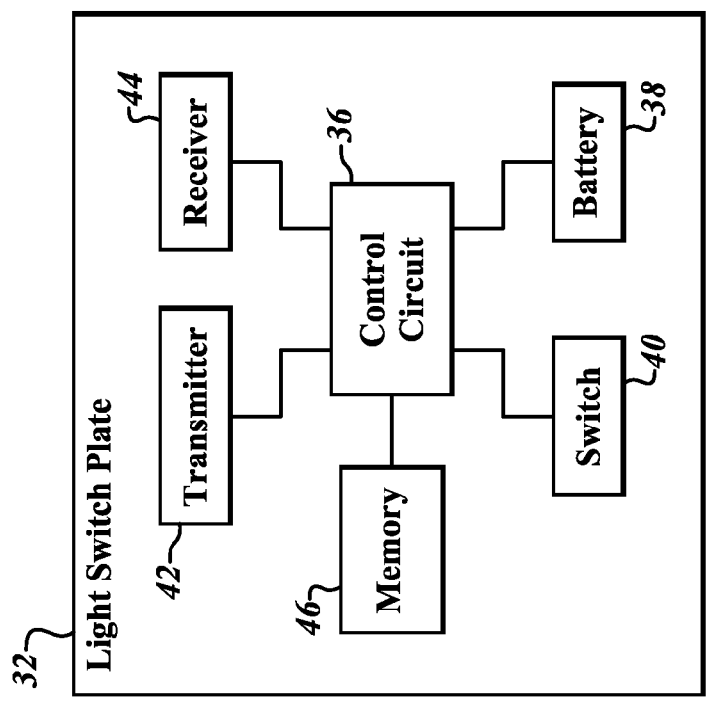
FIG.3
FIG.2

EASY-INSTALL HOME AUTOMATION LIGHT SWITCH

BACKGROUND

Technical Field

The present disclosure relates to the field of wirelessly controlled electrical appliances. The present disclosure relates more particularly to wirelessly controlled light assemblies and corresponding light switches.

Description of the Related Art

Electric lights are used to supply light inside of homes, in public areas, in commercial areas, and in many other settings. Commonly, electric lights receive power from an AC power source such as standard 120 V AC supplied to most homes by an electrical grid. Conventional electric lights are typically turned on and off by manipulating a switch that couples the electric light to the power supply.

In recent years some electric lights have included wireless receivers that enable the electric light to be turned on and off wirelessly by someone operating a special wireless transmitter that sends wireless commands to the electric light. However, this can cause confusion and inconvenience for those accustomed to using conventional light switches.

BRIEF SUMMARY

One embodiment of the invention is a light switch plate configured to be installed in place of a conventional light switch plate for a conventional light switch. When the light switch plate is installed, the light switch plate covers the conventional light switch in a manner that prevents the conventional light switch from being manipulated by a user.

The light switch plate includes a wireless transmitter, a battery, and a second light switch. The wireless transmitter can send a wireless command to a light to turn off or turn on the light. The second light switch is coupled to the wireless transmitter. The second light switch is positioned on the light switch plate to enable a user to manipulate the second light switch. When the user manipulates the second light switch, the wireless transmitter sends the wireless signal to the light to turn on or turn off the light. The battery provides power to the wireless transmitter.

In one embodiment a user can install the light switch plate by removing the screws from the conventional light switch plate mounted on a wall, removing the conventional light switch plate, and using the screws to fix the new light switch plate to the wall in place of the conventional light switch plate. This can easily be accomplished using only a screwdriver and without the need to shut off power to the light switch.

One embodiment includes a smart light bulb configured to be installed in place of a conventional light bulb. The smart light bulb includes a wireless receiver that receives the wireless signals from the wireless transmitter of the light switch plate.

In one embodiment a user can install the smart light bulb by unscrewing the conventional light bulb from a conventional light bulb socket and by screwing in the smart light bulb into the conventional light bulb socket. The smart light bulb can be installed without turning off power to the conventional light bulb socket.

In one embodiment, prior to removing the conventional light switch plate, the conventional light switch is turned to the "on" position. This ensures that AC power is supplied to the light bulb socket. Because the light switch plate covers the conventional light switch after installation, the conventional light switch is left continuously in the "on" position. Control circuitry in the smart light bulb can then turn the smart light bulb on and off according to the wireless signals transmitted by the wireless transmitter of the light switch plate.

BRIEF DESCRIPTION OF THE SEVERAL VIEWS OF THE DRAWINGS

FIG. 2 is a block diagram of a light switch plate according to one embodiment.

FIG. 3 is a block diagram of a smart light assembly according to one embodiment.

DETAILED DESCRIPTION

Figure 1A:
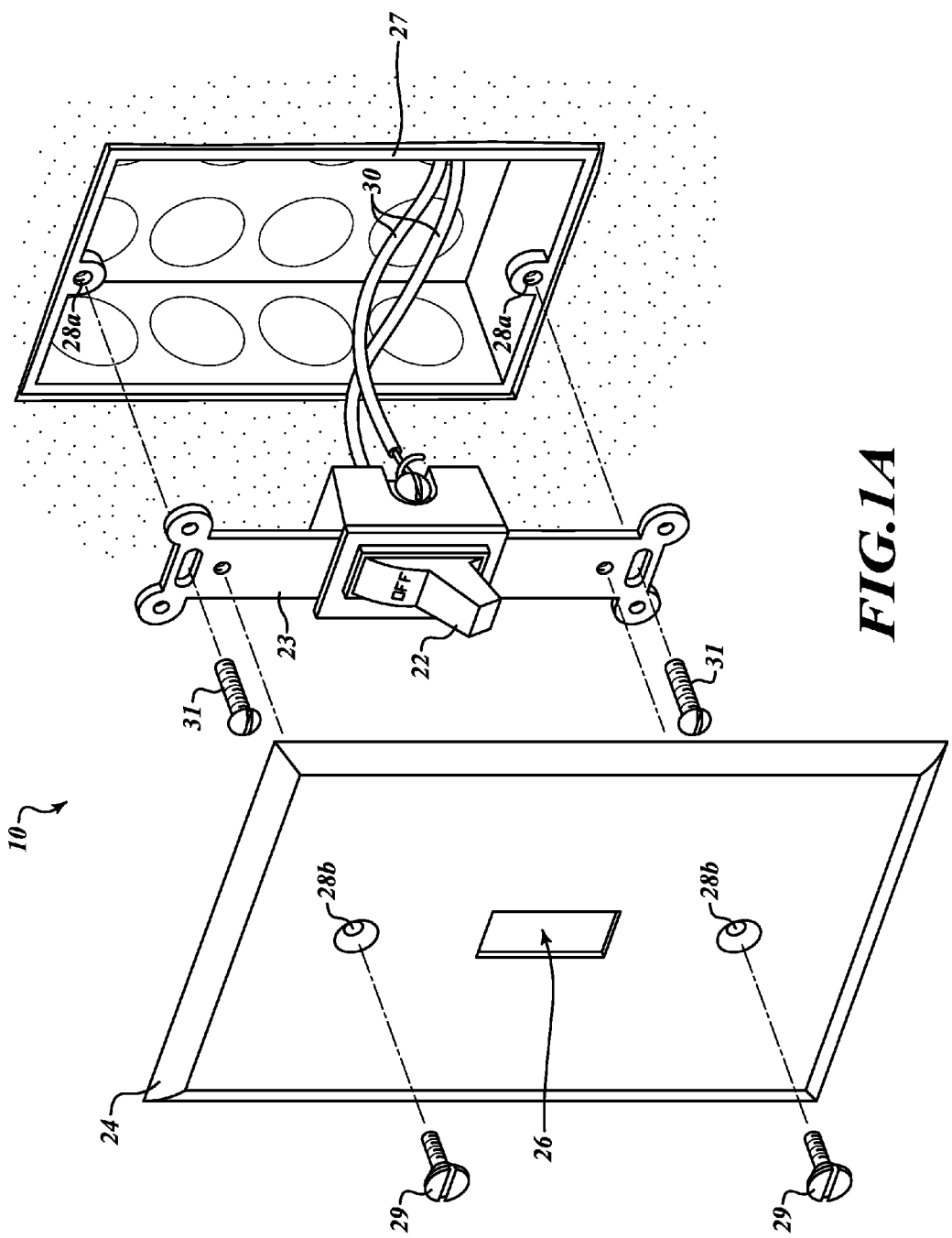
FIG. 1A illustrates a conventional light switch and a conventional light switch plate.

FIG. 1A illustrates the components of a conventional light switch assembly 10 according to one embodiment. The conventional light switch assembly 10 includes a light switch 22 fixed to a mounting bracket 23, a light switch plate 24, a mounting frame 27, mounting holes 28a in the mounting frame 27, mounting holes 28b in the light switch plate 24, screws 29, and screws 31.

The mounting bracket 23 is fixed to a wall by screwing screws 31 through holes in the mounting bracket 23 into mounting holes 28a. After the mounting bracket 23 is fixed to the wall, the light switch plate 24 is fixed to the wall by screwing screws 29 through mounting holes 28b of the light switch plate 24, and through the mounting bracket 23. With the light switch plates 24 fixed to the mounting bracket 23, the light switch 22 protrudes through the hole 26 in the light switch plate 24. A user can toggle the light switch 22 between on and off positions after the light switch plate 24 has been fixed to the mounting bracket 23.

The wires 30 couple the light switch 22 to a light that is controlled by the light switch 22. In one example the wires 30 carry an AC voltage. When the switch 22 is in the on position, the AC voltage is supplied to the light and the light is on. When the switch is in the off position the AC voltage is not supplied to the light and the light is off.

In one example the light is part of a smart light assembly that includes a wireless receiver configured to receive wireless signals to turn the light on and off. A user holding a remote control device can transmit a control signal from the remote control device to the smart light to turn the smart light on or off. The receiver in the smart light assembly receives the control signal and turns the light on or off according to the control signal. The smart light assembly includes switching functionality that allows the light to be switched on or off remotely.

The smart light assembly is also controlled by the light switch 22 as described previously. Because the light switch 22 is operable to connect or disconnect the smart light assembly from the AC power source, the smart light assembly can only function if the light switch 22 is in the on position. When the light switch 22 is in the on position the smart light assembly receives the AC voltage. In one example the smart light assembly includes circuitry that converts the AC voltage to a DC voltage. The DC voltage can then be selectively supplied to the light of the smart light assembly to turn the light on or off.

Figure 1B:
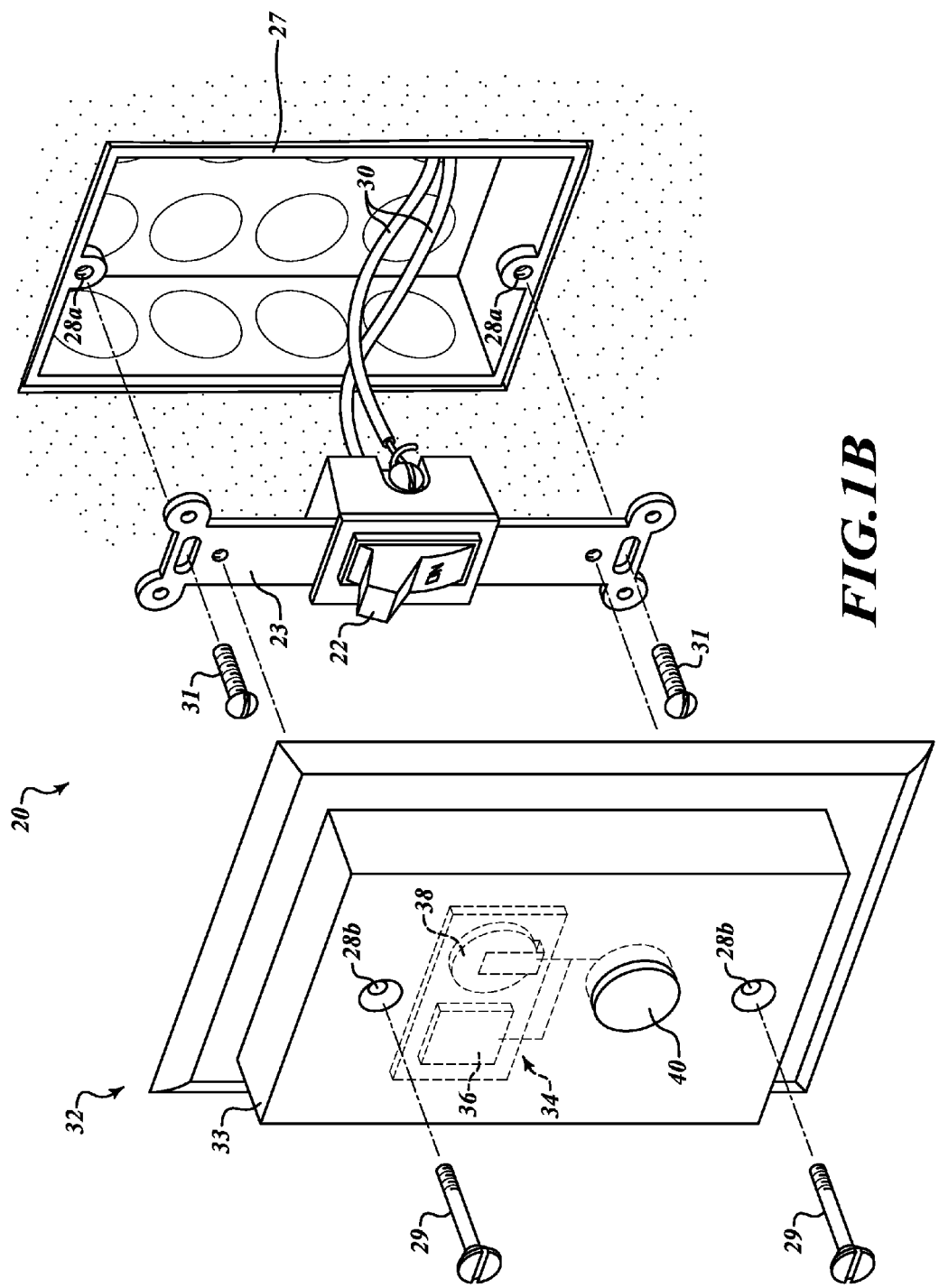
FIG. 1B illustrates a light switch plate including a wireless transmitter according to one embodiment.

FIG. 1B illustrates a wireless light switch assembly 20 according to one embodiment. The wireless light switch assembly 20 includes many of the same components as the conventional light switch assembly 10 described in relation to FIG. 1A. The wireless light switch assembly 20 includes the light switch 22 coupled to the mounting bracket 23. The mounting bracket 23 is coupled to the wall by screwing screws 31 through the screw holes 28a of the light switch frame 27 as described previously.

The wireless light switch assembly 20 further includes a wireless light switch plate 32. The circuit board 34 is coupled to the light switch plate 32. The circuit board 34 includes a transmitter 36 and a battery 38. A switch 40 is coupled to the circuit board 34.

The wireless light switch plate 32 can control the smart light assembly. In particular the transmitter 36 of the light switch plate 32 can send a control signal to the smart light assembly to turn on or turn off the light of the smart light assembly. A user can press the switch 40 which causes the transmitter 36 to transmit the control signal to the smart light assembly. The receiver of the smart light assembly receives the control signal and causes the switching functionality of the smart light assembly to turn the light on or off.

A user, who controls the smart light assembly by operating a remote control, as described previously, may also want to turn the light on or off by manipulating a light switch on the wall. It is common for a user to walk into an unlit room and by habit to manipulate the light switch 22 to turn on the light. It is also common for a user to exit the room and to turn off the light by manipulating the light switch 22 to the off position. In this case, a subsequent user who wishes to turn the light on by using the remote control will not be able to turn the light on because the light switch 22 is in the off position and no AC power is being supplied to the smart light assembly.

The light switch 22 can be replaced with a smart light switch that enables the user to turn the light on by using the remote control even if the light was last turned off by turning the smart light switch to the off position. This can be accomplished in several different ways. For instance, the wiring inside the walls can be changed so that the wall switch 22 does not control whether AC power is supplied to the smart light assembly. The mounting bracket 23 can then be replaced with a light switch that wireless closely controls the smart light assembly in a manner similar to the remote control. However, for a user that wishes to include smart light assemblies with wireless functionality while retaining wall switch functionality, this method can require extensive electrical work in rerouting wires or electrically disconnecting and removing the mounting bracket 23. This would typically include turning the power off to some portion of the residence or other building by operating a circuit breaker. In many cases a certified electrician would need to be hired to ensure that this is done safely and properly.

A light switch plate 32 according to one embodiment can avoid many of the drawbacks mentioned above. The light switch plate 32 can be installed without the need to turn off power to the light switch 22. The light switch plate 32 can be easily and quickly installed where a conventional light switch plate 24 was previously installed. This is done by removing the screws 29 from the light switch plate 24 of FIG. 1A and removing the light switch plate 24 from the wall. The light switch 22 is then turned to the on position so that AC power is supplied to the smart light assembly. The light switch plate 32 is then placed over the light switch 22 and screwed to the mounting bracket 23 by screwing screws 29 through screw holes 28b into the mounting bracket 23. The light switch plate 32 includes a protrusion 33 that covers the light switch 22 such that the user can no longer manipulate the light switch 22 without removing the light switch plate 32. All of this can be done conveniently, safely, and inexpensively using only a screwdriver and without turning off the electricity.

The switch 40 on the light switch plate 32 can be used to turn on and turn off the light of the smart light assembly. When the user manipulates the light switch 40, the transmitter 36 transmits a wireless control signal to the smart light assembly. The wireless receiver of the smart light assembly receives the control signal and turns the light on or off. The user can turn on or turn off the light by manipulating the switch 40 on the light switch plate 32.

Because the light switch 22 is placed in the on position prior to installing the light switch plate 32. AC power is continuously supplied to the smart light assembly. Thus the switching functionality of the smart light assembly can always turn the light on or off because AC power is all supplied to the smart light assembly.

The smart light assembly, examples of which are shown in relation to FIGS. 3 and 7, can also be installed safely and easily. In one example the smart light assembly is configured to screw into a conventional light bulb socket. Thus, a user who wishes to have smart light functionality in his home, can purchase a smart light assembly, unscrew a conventional light bulb from a conventional light bulb socket, and screw the smart light assembly into the conventional light bulb socket. In one example, the smart light assembly includes a wireless receiver, control circuitry, switching functionality, an AC to DC converter, and one or more lights. The lights can be LEDs, incandescent lights, halogen lights, or other kind of light.

Light switch plate 32 and the remote control can be paired to the smart light assembly so that smart light assembly will receive and execute the control signals sent by the remote control and the light switch plate 32. This allows a user to turn the light on or off using either the remote control or the switch 40 of the light switch plate 32.

Light switch plate 32 can be shaped differently than shown in FIG. 1B, as will be apparent to those of skill in the art in light of the present disclosure. The light switch plate 32 can be shaped in a manner suitable to cover the light switch 22 and to allow transmitter 36 to communicate with the smart light assembly.

In FIG. 1B the circuit board 34 includes only transmitter 36 and a battery 38. In practice, a circuit board 34 may contain many other circuit components such as a controller, a memory, a wireless receiver, or any other suitable components. In one embodiment the light switch plate 32 includes multiple circuit boards 34.

Light switch 22 has been shown as a conventional light switch that toggles up and down between on and off positions. However the light switch 22 can be any other kind of light switch including a slider, a rotating knob, a depressible button, or any other suitable type of switch. Likewise, the light switch 40 can be different than shown in FIG. 1B. For example, the light switch 40 can be a conventional toggling light switch, a slider, a rotating knob, or any other suitable switch, button, or input, suitable to cause the transmitter 36 to transmit the control signals to the smart light assembly.

The light switch plate 32 can consume very little electricity. In one embodiment, the light switch plate 32 only consumes electricity when transmitting a control signal to the smart light assembly. This can be done using minimal amounts of power. This means that the battery 38 can last for many years without being replaced.

The components shown and described in relation to FIG. 1B are given only by way of example. Many other types of components and configurations can be used to implement a light switch plate 32 in accordance with principles of the present disclosure.

In one embodiment, the light switch plate 32 transmits commands to the light assembly via a control module such as a wireless gateway or hub. When a user manipulates the switch 40, the light switch plate transmits a control signal. The control module receives the control signal, determines that the light switch plate 32 is paired with the smart light assembly, and transmits the control signal to the smart light assembly. The smart light assembly then executes the control signal and turns the light on or off as the case may be.

FIG. 2 is a block diagram of a light switch plate 32 according to one embodiment. The light switch plate includes a control circuit 36. The light switch plate 32 further includes a battery 38, a switch 40, a transmitter 42, a receiver 44, and a memory 46 all coupled to the control circuit 36.

In one embodiment the light switch plate 32 is configured to replace a conventional light switch plate 24 as described previously in relation to FIGS. 1A and 1B. The light switch plate 32 is configured to cover the conventional light switch 22 so that the conventional light switch 22 can no longer be manipulated while the light switch plate 32 is in place.

The light switch plate 32 is configured to send control signals to a smart light assembly to turn a light of the smart light assembly on or off. In particular, a user can manipulate the switch 40 to turn the light on and off. When the user manipulates the switch 40, the control circuit 36 causes the transmitter 42 to transmit the control signal to the smart light assembly.

The memory 46 therefore is configured to store command codes to be included in the control signals. The memory 46 can also store software instructions executable by the control circuit 36. When the user manipulates the switch 40 the control circuit 36 retrieves from the memory 46 the command codes to be included in the control signals. The command codes can include codes indicating commands to turn on, to turn off, or to dim the smart light. The memory 46 can include ROM, EEPROM, flash memory, SRAM, DRAM, or any other suitable memory.

When the user manipulates the switch 40, the control circuit retrieves from memory the command codes, and modulates the transmitter 42 to transmit control signals including the command codes.

In one embodiment the light switch cover plate 32 also includes a receiver 44. The receiver can be operable to receive information from the smart light assembly, or from a separate control module. In one example the light switch plate 32 receives signals from a control module indicating that the light should be turned on. The receiver 44 of the light switch plate 32 receives this signal from the control module and passes the signal to the control circuit 36. The control circuit 36 processes the incoming signal and causes the transmitter 42 to transmit control signals based on the signal received from the control module.

The battery 38 provides power to the control circuit 36 and to the other components of the light switch plate 32. In one embodiment the control circuit 36 remains in sleep mode until the switch 40 is manipulated. When the switch 40 is manipulated the control circuit 36 receives an interrupt signal or wake-up signal and causes the transmitter 42 to transmit the control signals, in this way the circuit components of the light switch plate 32 consume very little energy from the battery 38.

FIG. 3 is a block diagram of a smart light assembly 50 which can be used in conjunction with the light switch plate 32 of FIG. 2 according to one embodiment. The smart light assembly 50 includes a light 52 which can be switched on or off. The smart light assembly 50 further includes an AC power input 54 which receives an AC voltage from the wires 30 as described previously. A rectifier 56 is coupled to the AC input 54. A control circuit 60 is coupled to the rectifier 56. A receiver 62, a transmitter 64, a switch 55, and a memory 66 are each coupled to the control circuit 60.

The AC input 54 receives an AC voltage from wires 30 as described previously. The AC voltage is passed to the rectifier 56 which rectifies the AC voltage and outputs a DC voltage. The rectifier 56 can typically include a step-down transformer to reduce the voltage prior to rectifying the voltage. The rectifier 56 supplies DC power to the control circuit 60. The control circuit 60 controls the receiver 62, the transmitter 64, the memory 66, and the switch 55.

The receiver 62 is a wireless receiver, for example an RF or IR receiver, configured to receive control signals from the light switch plate 32, from a remote control, or from the control module. The control signals are configured to cause the light assembly 50 to turn on or turn off the light 52.

When the receiver 62 receives the control signal, the receiver 62 passes the control signal to the control circuit 60. The control circuit 60 processes the control signal and causes the switch 55 to supply cut-off power to the light 52.

The memory 66 stores command codes and executable software instructions for the control circuit 60. When the receiver 62 receives a control signal, the control circuit 60 processes the control signal and compares command codes in the control signal to command codes stored in the memory 66. If the control signal corresponds to a command code stored in the memory 66, the control circuit 60 executes the control signal and turns off the light 52 by operating the switch 55. The memory 66 can include ROM, EEPROM, flash memory, SRAM, DRAM, or any other suitable memory for storing information and data.

The control circuit 60 can also control the transmitter 64 to transmit signals to the remote control, to the control module, or to the light switch plate 32. The transmitter 64 is a wireless transmitter which can transmit wireless signals via RF or IR.

In one embodiment the smart light assembly 50 operates according to the ZigBee, Zwave, Bluetooth, or other wireless protocol. When utilizing the ZigBee protocol, the smart light assembly 50 is configured both to receive control signals and to retransmit control signals intended for other ZigBee devices such as other smart light assemblies or ZigBee capable appliances.

The receiver 62 can therefore receive control signals intended for other devices. The control circuit 60 processes the control signals and determines if the control signals are intended for the smart light assembly 50 or for another appliance. If the control circuit 60 determines that the control signals are for another appliance, the control circuit 60 causes the transmitter 64 to retransmit the control signals to other appliances. These other appliances can further repeat the control signals until the intended appliance receives and executes the control signal.

The receiver 62 can also receive status request signals. The status request signals can request the current status of the smart light assembly 50. The control circuit 60 processes a status request signals and determines if the status request signal is for the smart light assembly 50 or for another appliance. If the status request signal is for the smart light assembly 50, the control circuit 60 can cause the receiver 62 to transmit a status signal indicating the current status of the smart assembly. The status signal indicates whether the light 52 is on or off. If the control circuit 60 determines that the status request signal is for another appliance, then the control circuit 60 causes the transmitter 64 to repeat the status request signal.

The receiver 62 can also receive status signals from other appliances and can retransmit them. In one embodiment the control module originally sends out status request signals to determine a current status of all of the appliances in the home. The ZigBee equipped appliances receive the signals and either repeat them if they are intended for other appliances or transmit a status signal if the status request signal was intended for that particular appliance. In this way control signals, status request signals, and status signals can be passed to the intended recipients in network-like fashion by adding multiple appliances receive and retransmit the signals.

In one embodiment the light 52 includes one or more LEDs. LEDs can be turned on or off as the control circuit 60 operates the switch 55. Alternatively, the light 52 can include other types of lights including incandescent lights, halogen lights, or other suitable types of lights.

Figure 4:
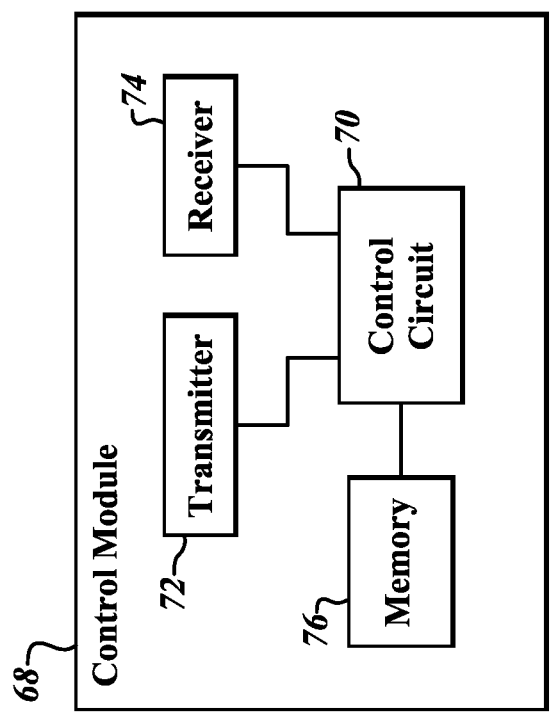
FIG. 4 is a block diagram of a control module according to one embodiment.

FIG. 4 is a block diagram of a control module 68 configured to control and monitor all of the wireless appliances including the smart light assembly 50 according to one embodiment. The control module 68 includes a control circuit 70, transmitter 72, the receiver 74, and a memory 76.

In one embodiment the control module 68 is configured to send control signals to a plurality of appliances that include wireless receivers and transmitters. The control signals can turn on the appliances, turn off the appliances, or cause them to adjust their functions in other ways.

In one embodiment the user can manipulate a remote control to control the control module. For example if a user wants to turn off a light in a different part of a house, adjust the thermostat, or turn on the sprinklers, the user can operate a remote control which communicates with the control module 68. The receiver 74 of the control module 68 receives command signals from the remote control and the control circuit 70 processes the control signals from the remote control. The control circuit 70 then causes the transmitter 72 to transmit control signals to the desired appliances, as the case may be. The control signals cause the appliances to turn on, turn off, or otherwise adjust their functions based on the user input.

The control circuit 70 can also store in the memory 76 data indicating the current state of each appliance in the residence. For example, the control circuit 70 can cause the transmitter 72 to transmit status request signals to other appliances such as the smart light assembly 50. The status request signals are received by the appliances and in reply the appliances transmit status signals indicating the current status of the appliances. The receiver 74 receives the status signals and the control circuit 70 processes the status signals. The control circuit 70 then stores in the memory 76 the current status of each appliance.

In one embodiment, when the light switch plate 32 transmits commands to smart the light assembly 50, the control module 68 receives the control signal, determines that the light switch plate 32 is paired with the smart light assembly 50, and transmits the control signal to the smart light assembly 50. The smart light assembly then executes the control signal and turns the light on or off as the case may be. The light switch plate 32 therefore can transmit control signals to the smart light assembly via the control module 68.

In one embodiment the control module 68 is a television receiver coupled to a television. The television receiver 68 can transmit control signals to control appliances, or to transmit status request signals, as the case may be. In addition to the control module components shown in FIG. 4, the television receiver 68 can further include video and audio output ports, video and audio input ports, video and audio processing circuitry, digital video recorder capability, and other suitable components for the television receiver 68.

Figure 5:
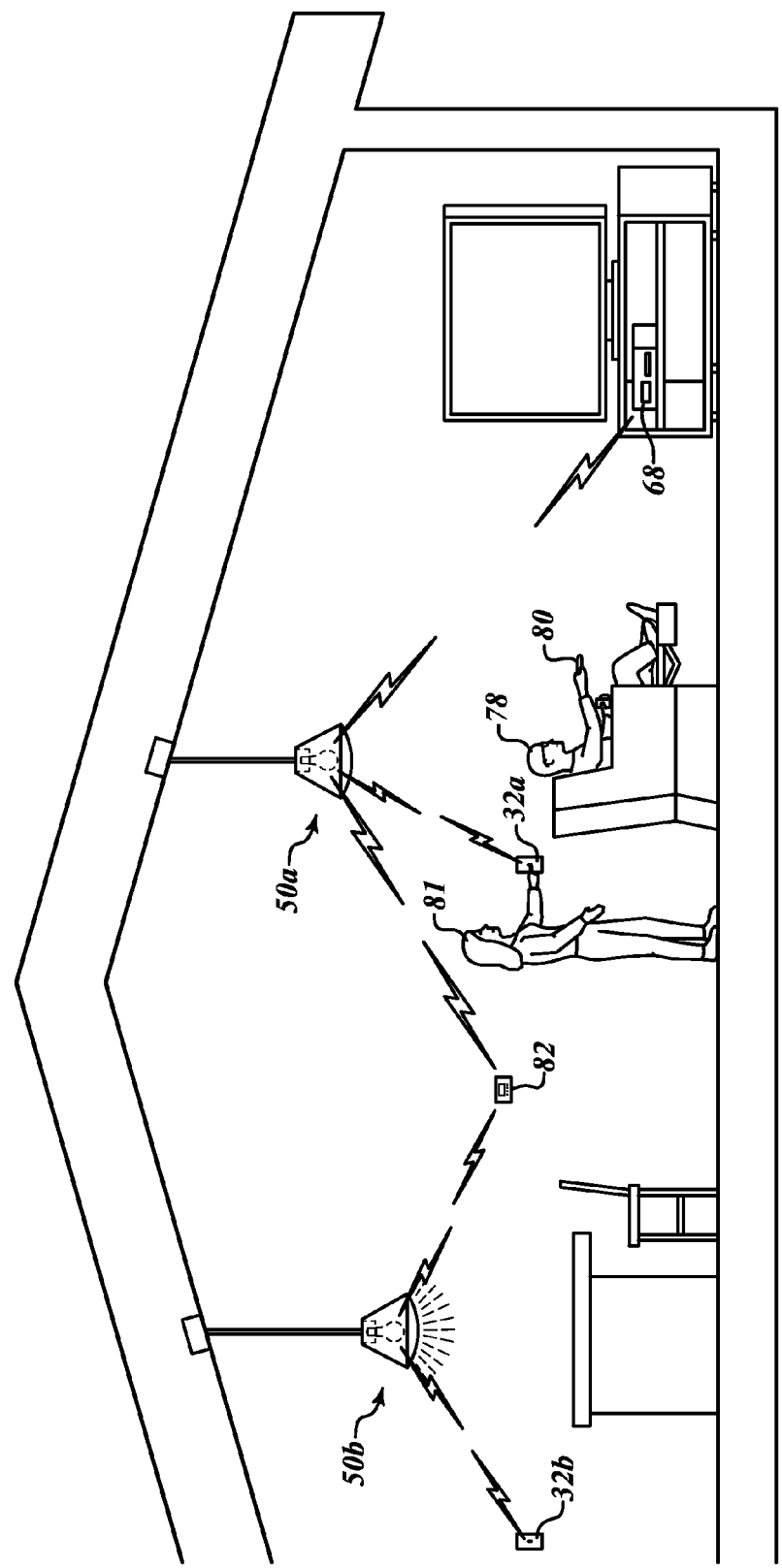
FIG. 5 illustrates a residence including multiple light switch plates and smart light assemblies according to one embodiment.

FIG. 5 illustrates a residential setting in which light switch plates 32a and 32b are be implemented. The residential setting includes a television receiver 68, two smart light assemblies 50a and 50b, thermostat 82, and the two light switch plates 32a and 32b. The light switch plates 32a and 32b include wireless transmitters 42 as described previously.

A user 78 is holding a remote control 80 by which the user can control the television receiver 68. In particular, the user 78 can operate the remote control 80 to cause the television receiver 68 to send control signals to the smart light assemblies 50a and 50b. The smart light assemblies 50a and 50b receive the control signals and turn on or turn off.

Another user 81 can manipulate the switch 40 on the light switch plate 32a to send a control signal from the light switch plate 32a to the smart light assembly 50a. The control signal causes the smart light assembly 50a to turn on or turn off.

The light switch plate 32b can send control signals to the smart light assembly 50b. The control signals cause a smart light assembly 50b to turn on or turn off.

If the television receiver 68 sends a control signal to the smart light assembly 5013, the control signal may be received by the smart light assembly 50a. When the smart light assembly 50a receives a control signal intended for 50b, the smart light assembly 50a can retransmit the control signal. When the control signal is retransmitted from the smart light assembly 50a, the thermostat 82 may receive the control signal. If the thermostat 82 receives the control signal intended for the smart light assembly 50b, then the thermostat 82 retransmits the control signal. The smart assembly 50b receives the control signal from the thermostat 82 and turns on or turns off according to the control signal. The television receiver 68 can therefore send control signals to distant appliances. Each appliance that receives the control signal retransmits the control signal until the desired appliance has received and executed the control signal.

In like manner the television receiver 68 can transmit status request signals to each appliance in the house with wireless capability. Status request signals are received and retransmitted from the appliances until the desired appliances have received the status request signals. The appliances can then transmit status signals indicating their respective current statuses. The appliances receive each other's status signals and transmit them until the television receiver 68 has received all of the status signals.

While FIG. 5 discloses smart light assemblies 50a and 50b, thermostat 82 light switch plates 32b and 32a, and a television receiver 68, each having wireless capability, in practice many other appliances can also have wireless capability. For example, garage door openers, computers, kitchen appliances, sprinkler systems, televisions, game consoles, and many other types of appliances can each include wireless capability. When operating or using the protocol or other protocol, the appliances can receive and retransmit signals until each appliance has received the intended signals. Alternatively, the signals can be broadcast over a wireless Internet network or any other suitable wireless transmission protocol.

Figure 6:
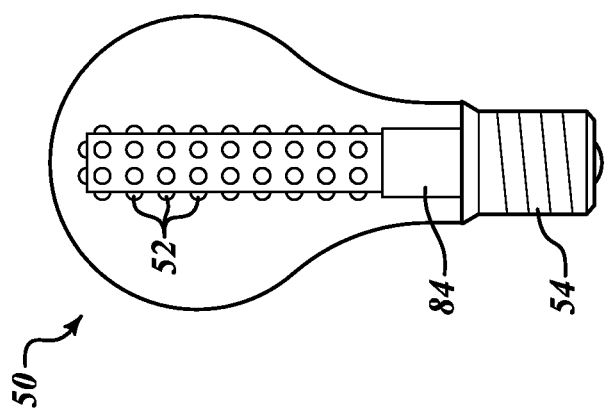
FIG. 6 illustrates a smart light assembly according to one embodiment.

FIG. 6 illustrates a smart light assembly 50 according to one embodiment. The smart light assembly 50 includes a threaded AC input 54, lights 52, and a circuit module 84.

The circuit module 84 can include the circuit components disclosed in relation to FIG. 3. In particular the circuit module 84 can include voltage rectifier 56, a control circuit 60, a transmitter 64, a receiver 62, a memory 66, and a switch 55.

The smart light assembly 50 includes threaded AC inputs 54 which can be screwed into a conventional light bulb socket. The smart light assembly 50 can receive control signals from light switch plate 32, the control module 68, or other appliances. The control signals cause the smart light assembly 50 to illuminate the lights 52.

In one embodiment, the lights 52 are LEDs which can be collectively or individually eliminated by the control circuit 60. Alternatively, the lights 52 can be other types of lights. While FIG. 6 illustrates multiple lights 62, the smart light assembly 50b includes only a single light in other embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a light assembly;
a light switch plate including a protrusion configured to cover a first light switch that is electrically coupled to the light assembly by at least one wire, the protrusion being configured to prevent user manipulation of the first light switch without removing the light switch plate;
a first wireless transmitter coupled to the light switch plate; and
a control module configured to transmit first control signals to the light assembly, the light assembly including:
a wireless receiver;
control circuitry coupled to the wireless receiver, the wireless receiver being configured to receive the first control signals and to pass them to the control circuitry, the control circuitry being configured to execute the first control signals;
a light coupled to the control circuitry, the first wireless transmitter configured to transmit second control signals to the light assembly, the wireless receiver configured to receive the second control signals and to pass them to the control circuitry, and the control circuitry configured to turn the light on or off based on the second control signals; and
a second wireless transmitter coupled to the control circuitry, the control circuitry being configured to determine if the first control signals are meant for the light assembly, the second wireless transmitter being configured to retransmit the first control signals if the control circuitry determines that the first control signals are meant for a second light assembly.

2. The system of claim 1 wherein the light assembly includes a voltage regulator coupled to the control circuitry and configured to receive an AC voltage and to output a DC voltage to the light.

3. The system of claim 2 wherein the light assembly is configured to screw into a standard threaded incandescent light bulb socket.

4. The system of claim 1 comprising a second light switch coupled to the light switch plate and the wireless transmitter, the second light switch configured to cause the wireless transmitter to transmit the control signals to the light assembly.

5. The system of claim 1 wherein the control module is configured to transmit an interrogation signal to the light assembly, the control circuitry being configured to determine a current state of the light and to cause the second wireless transmitter to transmit to the control module data indicative of the current state of the light.

6. The system of claim 5 comprising a television receiver, the control module being mounted to the television receiver, the television receiver configured to receive commands from a user and to transmit the second control signals in response to receiving the commands from the user.

7. A method comprising:
covering a first light switch with a light switch plate, the first light switch being electrically coupled to a first light assembly by at least one wire and configured to turn on and turn off a light of the first light assembly;
preventing, by a protrusion of the first light switch, user manipulation of the first light switch without removing the light switch plate;
transmitting a control signal to the first light assembly from a first wireless transmitter coupled to the light switch plate;
receiving the control signal in a wireless receiver of the first light assembly;
determining whether the control signal is meant for the first light assembly;
in response to determining that the control signal is meant for the first light assembly, passing the control signal to control circuitry coupled to the wireless receiver and executing the control signal by outputting a switching signal from the control circuitry; and
in response to determining that the control signal is not meant for the first light assembly, transmitting the control signal to a second light assembly from a second wireless transmitter coupled to the control circuitry.

8. The method of claim 7 comprising transmitting the control signal in response to receiving user input on a second light switch coupled to the light switch plate.

9. The method of claim 7 comprising:
receiving an interrogation signal in the wireless receiver; and transmitting, from the second wireless transmitter coupled to the control circuitry, a response signal including data indicating a present state of the light.

\* \* \* \* \*